United States Patent

Yamauchi

[11] Patent Number: 6,067,117
[45] Date of Patent: May 23, 2000

[54] IMAGE SIGNAL PROCESSOR

[75] Inventor: Tatsuo Yamauchi, Tokyo, Japan

[73] Assignee: Oki Electric Industry Co., Ltd., Tokyo, Japan

[21] Appl. No.: 08/820,658

[22] Filed: Mar. 18, 1997

[30] Foreign Application Priority Data

Mar. 19, 1996 [JP] Japan ................................. 8-062739

[51] Int. Cl.[7] .............................. H04N 7/26; H04N 5/272
[52] U.S. Cl. .......................... 348/390; 348/584; 348/598
[58] Field of Search .................................. 348/390, 384, 348/584, 598; 386/109, 112; H04N 7/26, 5/272

[56] References Cited

U.S. PATENT DOCUMENTS

| 5,164,839 | 11/1992 | Lang | 348/384 |
| 5,559,562 | 9/1996 | Ferster | 348/584 |
| 5,644,364 | 7/1997 | Kurtz | 348/584 |
| 5,649,046 | 7/1997 | Stewart | 386/109 |

Primary Examiner—Howard Britton
Attorney, Agent, or Firm—Rabin & Champagne, P.C.

[57] ABSTRACT

An image signal processor wherein an image is divided spatially or on a time series basis into multiple units, and is encoded on the basis of the divided unit, in order for image transform processing such as cutting, insertion, and composing thereof, to be performed upon one or multiple encoded image signals, The system includes an object detection circuit 5 (25) for detecting from the image signals a block or field unit as an object of image transform processing local decoding circuits 3, 4 (23, 34) for locally decoding only the image signals of the block or field unit detected by the object detection circuit; a processing circuit 7 (27) for processing the image signals decoded by the local decoding circuits 3, 4, (23, 24); a local encoding circuit 8 (28) for locally encoding the image signals processed by the processing circuit 7 (27); and a composing circuit 9 (29) for composing both the image signals encoded by the circuit 8 (28) and original image signals. With the system, only the portion to be edited is locally decoded while the others are not decoded and remain as original image signals, so that the portion to be decoded is minimized and a high quality image can be maintained even though the image transform processing is repeated.

6 Claims, 5 Drawing Sheets

IMAGE SIGNAL PROCESSOR

BACKGROUND OF THE INVENTION

This invention relates to an image signal processor, and more particularly relates to the image signal processor capable of performing image transform processing over a local portion which is specified in the encoded image signals spatially or on a time series basis.

Generally, the image transform processing (for example, editing, conversion, level position transform) of the image signals encoded by means of the high efficiency encoding, is carried out as follows. That is, the encoded image signals are decoded once at first. In the next, the image transform processing is performed based on these decoded image signals. Finally, the transformed image signals are again encoded.

For instance, in the case of composing two image signals which have been encoded according to the Discrete Cosine Transform (referred to as DCT hereinafter), the image transform processing of these image signals can not be carried out before they are decoded by the inverse DCT. An example of the processing for composing the image signals encoded by DCT will be described with reference to FIG. 2. This figure is a block diagram of a prior art image signal processor which performs non-linear image editing with the use of a hard disk memory.

In the figure, reference numeral 31 designates a hard disk memory, in which there are stored the encoded image signals which have been encoded according to such an encoding standard as the Joint Photographic Coding Experts Group (JPEG) or the like. The encoded signals are read out from the disk memory and decoded by a decoding circuit 32, thereby decoding them back to the original component signals (the image signals are treated in the form of the component signals in JPEG). A processing circuit 33 transforms these component signals by way of cutting, inserting, and/or composing the image signals. The image signals (component signals in this case) finished through the image transform processing are again encoded by means of an encoding circuit 34 and stored in the hard disk memory 31. Referring to FIG. 2 again, reference numeral 35 designates a key box, which serves as a source for generating control signals instructing the processing circuit 33 to perform the image transform processing. Upon receipt of the control signals, the processing circuit 33 executes the image transform processing.

Now, in case of encoding the image signals by means of the DCT or the like in order to enhance the encoding efficiency, it is often observed that a considerable amount of the image information is dropped in the course of encoding the image signals. Therefore, if the encoded image signals are decoded as they are, it occurs that the difference between the decoded image signals and the original ones is made larger. In this way, as the encoded image signals are irreversible signals, the image quality is made worse at every repetition of encoding and decoding of image signals.

However, according to the prior art image signal processor as described above, in the case of editing the encoded image signals, it is required that decoding and encoding steps have to be performed over the entirety of the encoded image signals. This encounters the problem that repetition of the image transform processing, for instance editing of the image, leads to the severe degeneration in the quality of image signals.

Accordingly, an object of the invention is to provide a novel and improved image signal processor, in which degeneration in the quality of image signals can be suppressed to the minimum even though encoding and decoding of image signals are repeatedly executed for the image transform processing.

Furthermore, another object of the invention is to provide a novel and improved image signal processor, in which the image transform processing can be carried out only over the necessary minimum unit of the image signals which is specified spatially and/or on a time series basis, thereby shortening the time required for the image transform processing and at the same time, enhancing the efficiency of the image transform processing.

These and other objects of the invention will be made more clear by the description as is made in the following.

SUMMARY OF THE INVENTION

In order to solve the problem as described above, the invention provides an image signal processor, which comprises:

an encoded image signal pickup means which encodes an image on the basis of a unit as defined by dividing the image spatially and/or on a time series basis and picks up one or a plurality of encoded image signals;

an object specifying means, which specifies the objective encoded image signals contained in a unit, selected as an object of image transform processing from the encoded image signals picked up by the encoded image signal pickup means;

a local decoding means which locally decodes only the encoded image signals specified by the object specifying means;

a processing means which performs a predetermined processing to the image signals decoded by said local decoding means;

a local encoding means which locally encodes the image signals processed by the processing means; and a composing means which composes the encoded image signals encoded by the local encoding means and the original encoded signals contained in units other than the objective unit.

According to the system constituted as described above, an encoded image signal unit among the encoded image signals is first specified as the object of image transform processing by the object specifying means, and the local decoding means locally decodes only the encoded image signals contained in the unit, and then, the image transform processing is carried out based on the decoded image signals. That is, the signal encoding and decoding required for the image transform are performed only on the necessary minimum portion of the image signals, so that the degeneration of the image quality is minimized. Furthermore, the image transform processing is carried out on only the necessary minimum unit, so that the time needed for image transform processing is shortened and efficiency of the processing is enhanced.

In case of dividing the image, it is possible to adopt a block unit which is defined by spatially dividing the image and to specify the encoded image signals contained in the block unit by the object specifying means, as the object of the image transform.

In this case, however, it is preferable that encoding of the image signals contained in one block unit is carried out without giving any influence to encoding of the image signals contained in other block units.

Furthermore, in case of dividing the image, it is possible to adopt a field unit which is defined by dividing the image on a time series basis, and to specify the encoded image signals contained in the field unit by the object specifying means, as the object of the image transform. The unit resulting from dividing the image on the time series basis is referred to herein as a field unit or a frame unit.

In this case, however, it is preferable that encoding of the image signals contained in one field unit specified by the object specifying means might influence encoding of the image signals contained in other field units, but the former is not influenced by the latter.

The image signal processor according to the invention can be most preferably applied to the case where the irreversible encoding process is required in order for the high efficiency encoding to be carried out.

DESCRIPTION OF THE PREFERRED EMBODIMENTS

The image signal processor according to the invention will now be described in detail in the following, with reference to the accompanying drawings showing some preferred embodiments of the invention.

First Embodiment of the Invention

Now, in the following, there will be described an image transform processor embodying the invention. This system is preferably applicable to such a case that the image transform processing is required for one or a plurality of encoded image signals, which are produced by spatially dividing an image into a plurality of unit blocks and encoding them on a unit block basis.

Figure 1:
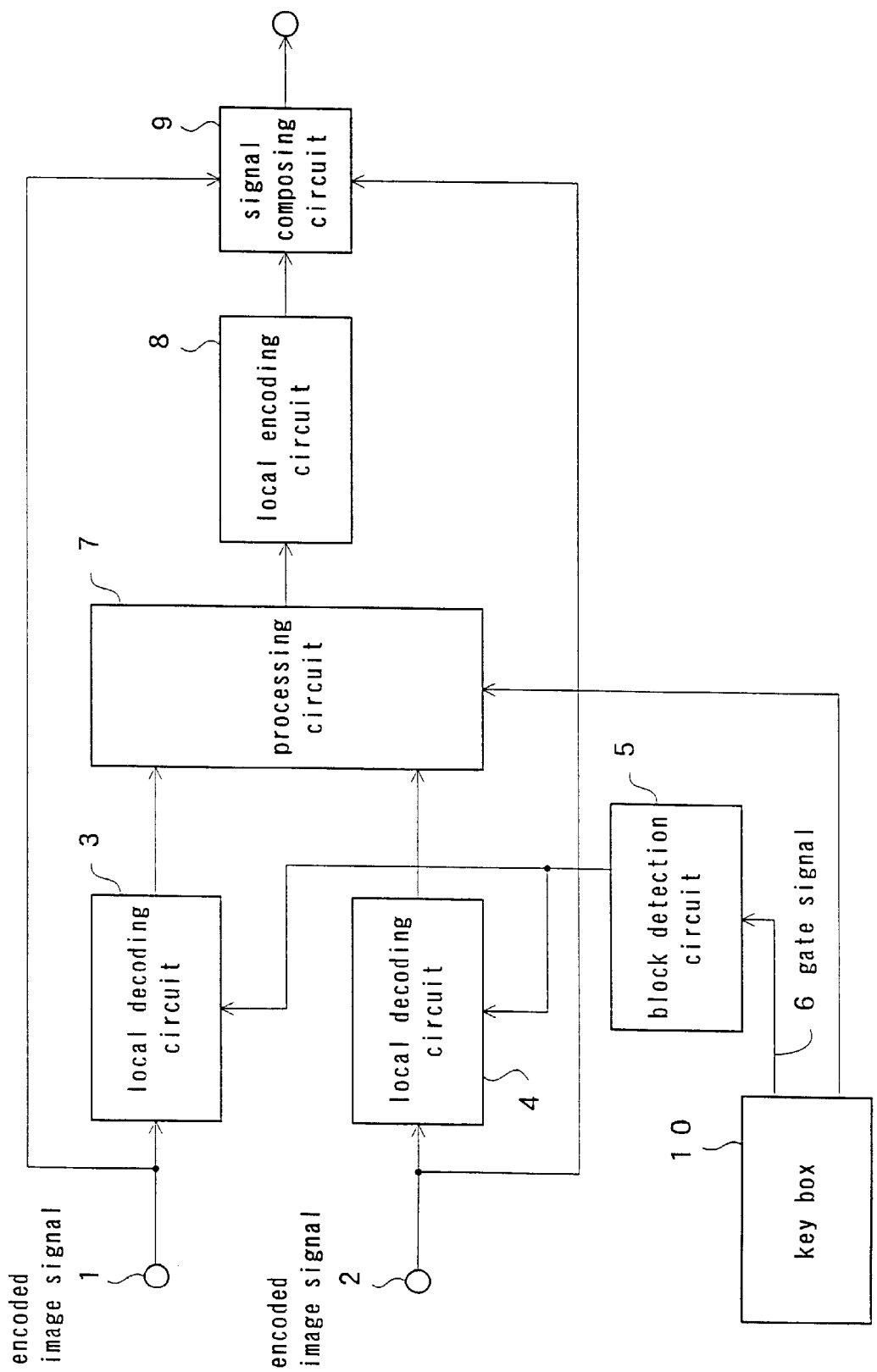
FIG. 1 is a block diagram showing the entire constitution of the image signal processor according to the first embodiment of the invention.
Figure 2:
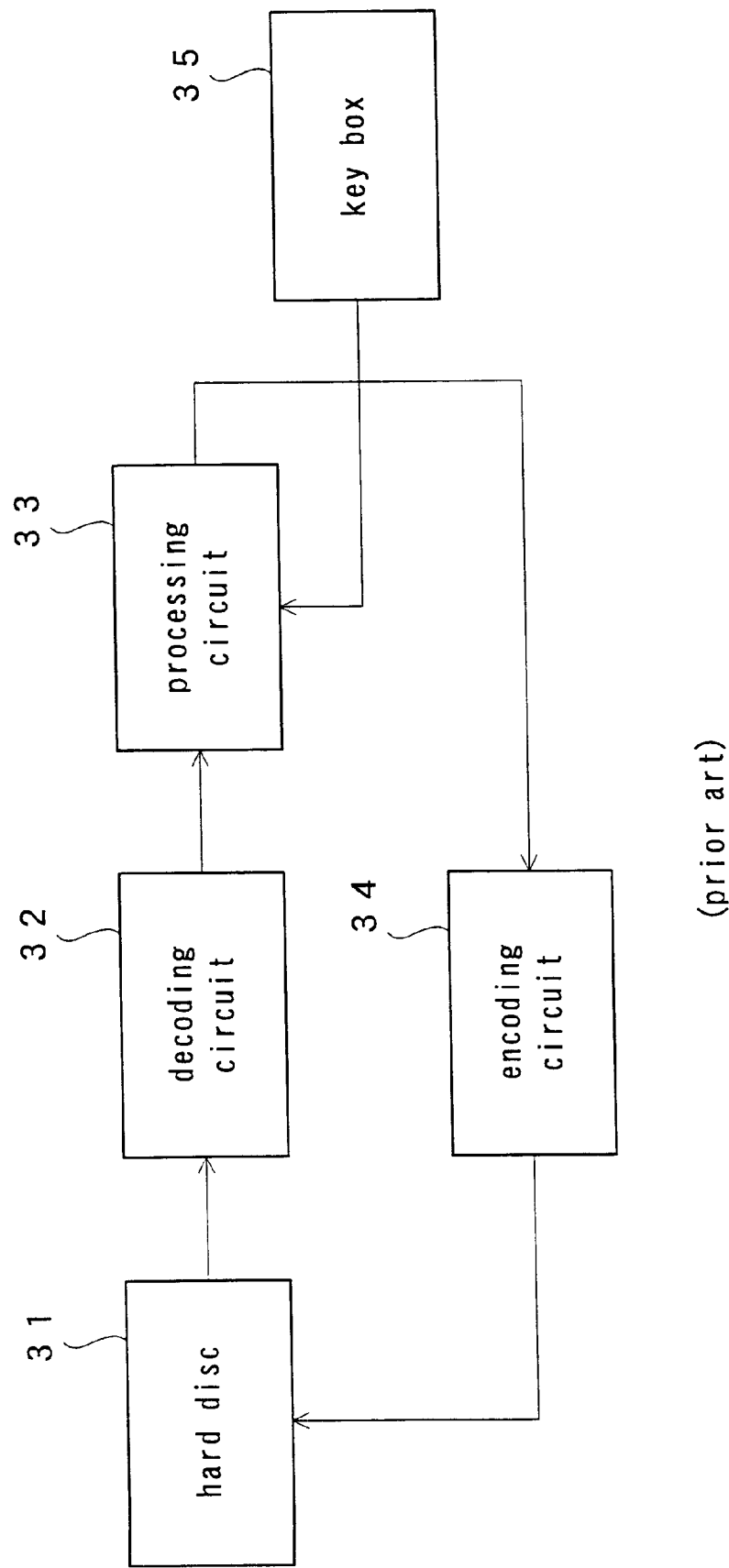
FIG. 2 is a block diagram showing the constitution of a prior art image signal processor.
Figure 3:
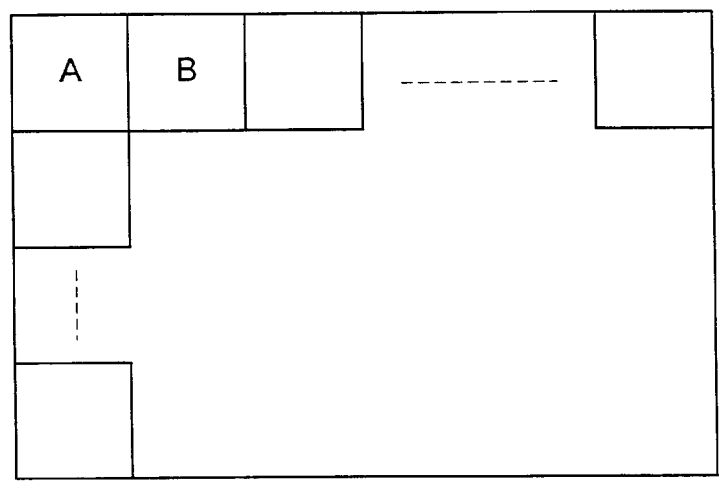
FIG. 3 is an illustration for explaining an example of encoding the image on the block basis.

FIG. 1 is a block diagram showing the entire constitution of the image signal processor according to this embodiment, and FIG. 3 is an illustration showing an image which is divided lengthwise and breadthwise into a plurality of image unit blocks and encoded on the block basis (i.e. block encoding).

In this embodiment, the image transform processing is carried out on the image signals of which encoding may be completed at every one frame or field as in the encoding by means of the JPEG standard. Furthermore, in this embodiment, the image transform processing will be described by way of an example in which two encoded image signals 1, 2 are composed.

Two encoded image signals 1, 2 are signals which result from encoding component signals according to the JPEG standard. In other words, they are signals produced by dividing original image signals (digital signals) into a plurality of unit image signal blocks, of which each consists of pixels of m x n-lines (where m and n are integers), and then, separately performing high efficiency encoding over these unit blocks. As mentioned above, encoded image signals 1, 2 consist of unit image signal blocks which are mutually independent, so that as shown in FIG. 3, in the process of encoding the block A and the block B adjacent thereto, they have not any correlation therebetween. Thus, the information contained in the block A will not be influenced in the course of encoding the block B.

Encoded image signals 1, 2 are respectively inputted to local decoding circuits 3, 4 as a local decoding means. These local decoding circuits 3, 4 identify which image signal block within an image is to be edited referring to a block specifying signal from a block detection circuit 5 that will be described later, and locally decode the encoded image signals within the specified block. The block detection device 5 detects, referring to a gate signal 6, which image signal block within the image is an objective block to be edited, and transmits a block specifying signal to local decoding circuits 3, 4. Reference numeral 7 designates a processing circuit as a processing means which performs the image transform processing, for instance the processing for composing image signals. The image signals from local decoding circuits 3, 4 are inputted to the processing actually circuit 7, in which the image transform processing is carried out. A reference numeral 8 represents a local encoding circuit as a local encoding means. The image signals, once having been transformed through the processing circuit 7, are again encoded through this local encoding circuit 8. Reference numeral 9 indicates a signal composing circuit as a signal composing means. Original encoded image signals 1, 2 and the encoded image signals from the local encoding circuit 8 are selectively composed by means of the signal composing circuit 9. Reference numeral 10 designates a key box like a switcher, for use in editing of the image. Actual operation for editing the image is conducted by this key box 10. Signals from this key box are transmitted to the block detection circuit 5 as gate signals for specifying the objective block to be edited, and is further transmitted to the processing circuit 7 where the image transform processing is actually carried out.

Next, it will be described how two encoded image signals are composed by means of the image signal processor as above constituted. In this case, the description will be made with reference to the case, as shown in FIG. 4, where encoded image signals in connection with two images C and D are edited to produce encoded image signals of a composite image E.

Figure 4:
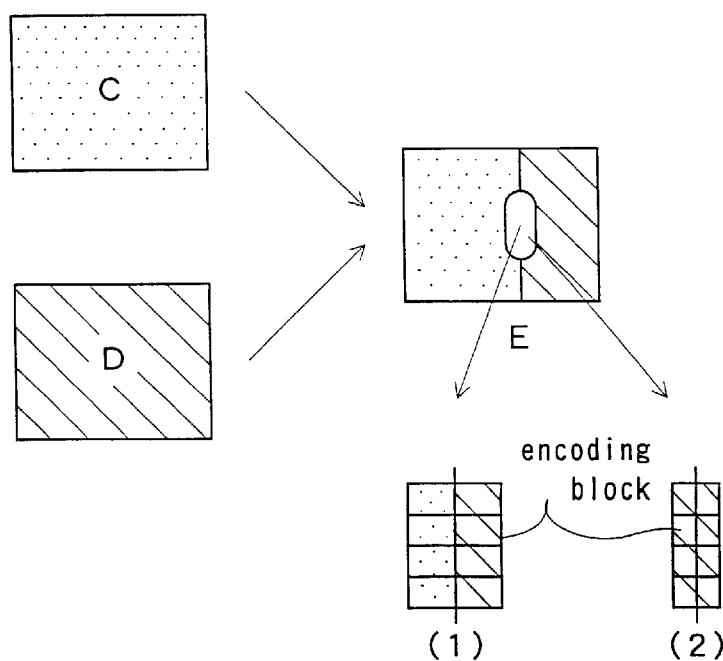
FIG. 4 is an illustration for explaining an example of composite edition of images.

In case the boundary between images C and D coincides with the boundary between blocks as indicated in FIG. 4 (1), there is no need to decode any of image signals. Encoded image signals 1, 2 may be composed as they are. Contrary to this, if not, as indicated in FIG. 4 (2), the composite processing is carried out after the discordant local part is once decoded.

In the image signal processor according to this embodiment, the gate signal 6 is inputted to the block detection circuit 5 by operating the key box 10. In response to this gate signal 6, the block detection circuit 5 detects one or a plurality to objective blocks to be edited, and the block specifying signals are inputted to local decoding circuits 3, 4, in which the objective block group to be edited (FIG. 4 (2)) is specified referring to the block specifying signals and the encoded image signals related to that part are decoded. These decoded local image signals are inputted to the processing circuit 7, and then the processing for image composition is carried out. The composite local image signals are again encoded by means of the local encoding circuit 8 and then, outputted to the image signal composing circuit 9. In this image signal composing circuit 9, the locally encoded signals and encoded image signals 1, 2 as inputted are composed on the block basis.

As above described, according to this embodiment, in case the objective block to be edited is merely a part of encoded image signals 1, 2 as inputted, only that part is decoded and processed by the image transform processing while the remaining blocks thereof are processed as they are, without being decoded, so that the part to be decoded can be minimized. As a result of this, the high quality of the encoded image signals can be maintained despite of the image transform processing with repetitive encoding and decoding. Furthermore, the time necessary for performing the image transform processing can be shortened, thereby enabling the efficiency of the processing to be enhanced.

Second Embodiment of the Invention

Next, the description will be extended to the second embodiment of the invention. The image signal processor ofs the second embodiment of the invention is applicable to the encoded image signals of which encoding can not be completed within a frame or field itself.

Figure 5:
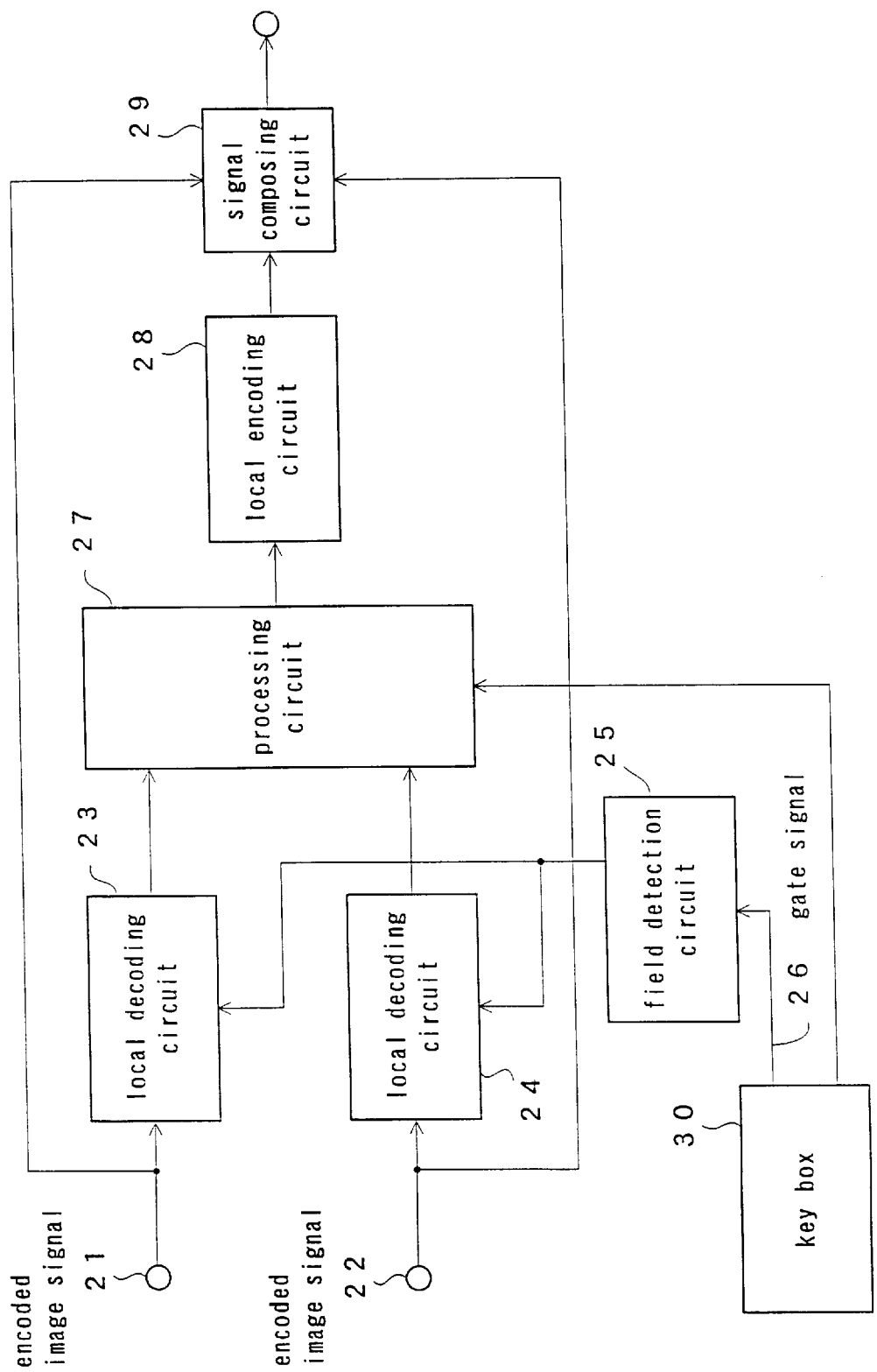
FIG. 5 is a block diagram showing the entire constitution of the image signal processor according to the second embodiment of the invention.

The entire constitution of this system is almost identical to that which has been described in connection with the first embodiment of the invention. As will be seen in FIG. 5, local decoding circuits 23, 24, a processing circuit 27, a local encoding circuit 28, a composing circuit 29, and a key box 30 are constituted in the almost same way as those of the first embodiment as mentioned above. However, the feature of this embodiment exists in a field detection circuit 25 as a means for specifying an objective unit field to be processed. This field detection circuit 25 detects an objective unit field to be transformed in connection with the image transform processing of encoded image signals 21, 22 in this embodiment.

Figure 6:
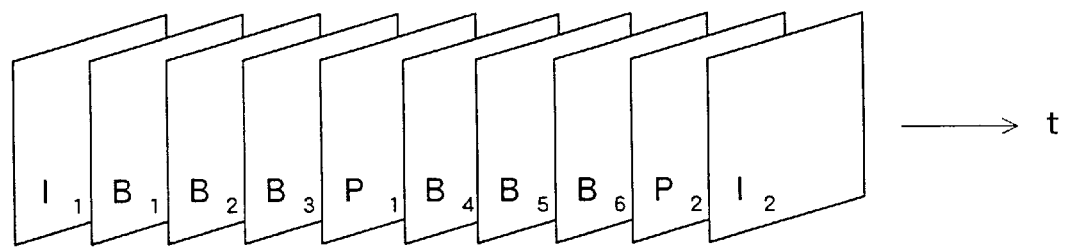
FIG. 6 is an illustration for explaining an example of encoding by means of MPEG2.

These encoded image signals 21, 22 are such signals as encoded, for instance according to the MPEG 2 standard, that is, by means of inter-frame encoding, inter-field encoding, or motion adaptive encoding. Consequently, they are signals which are mutually interrelated over a plurality of frames and of which each can not be completed by itself. To be more concrete, they are encoded image signals produced by encoding component signals according to the MPEG 2 standard. Accordingly, as shown in FIG. 6, they are encoded correlating with a plurality of unit fields. That is, in-field encoded signals (I-picture) appear every several fields, and there exist within a section from one I-picture to the next, other fields i.e. inter-field forward directional anticipation encoded signals (P-picture) and bidirectional anticipation encoded signals (B-picture). In this case, the P-picture is made up of the inter-field encoded signals and performs the forward directional anticipation based on I-pictures and/or B-pictures in the past while the B-picture is made up of the inter-field encoded signals and performs the bidirectional anticipation. Encoded image signals 21, 22 are constituted as described above, so that the image transform of just one field can not be separately carried out without giving the slightest influence to several fields. Therefore, the minimum unit which can be locally treated as an object for image editing is one duration of the in-field encoded signals i.e. an I-picture section.

Therefore, the field detection circuit 25 is constituted to detect the objective duration (field unit) i.e. the I-picture section of the encoded image signals 21, 22 based on the gate signals from the key box 30.

Thus, field detection circuit 25 outputs signals specifying the objective duration i.e. the unit field to be processed based on the I-picture section, and transmits them to the local decoding circuits 23, 24, which in turn specify the objective duration for editing and decode it. The decoded objective duration is processed for composing at the processing circuit 27. After this, the decoded and composed objective duration is again encoded at the local encoding circuit 28 and then, is inputted to the composing circuit 29 to be selectively composed together with the encoded signals 21, 22.

As described above, a portion of the encoded image signals which is defined on a time series basis and is repeatedly encoded and decoded, is limited to a minimum portion i.e. the field unit, so that the image formed of image signals having been repetitively encoded and decoded image signals can be still maintained at the same high quality level as in the first embodiment as mentioned above. Furthermore, the time required for the image transform is so shortened that the image transform processing can be carried out efficiently.

The image signal processor of the invention has been discussed by way of the preferred embodiments with reference to the accompanying drawings. It should be noted, however, that the invention is not limited to the embodiments as mentioned above. It is apparent that anyone skilled in the art may think out various changes and modifications of the system within the category of the technical concept as recited in the attached patent claims. Thus, it should be understood that needless to say, such changes and modifications also belong to the technical scope of the invention.

For instance, in the first embodiment, the image is divided lengthwise and breadthwise into blocks and is encoded on a block basis. However, it may be divided only breadthwise to be encoded and encoded on such a divided block basis.

Furthermore, the second embodiment has been described in connection with the image signals which are encoded on a field unit basis. However, the image signal processor of the second embodiment is applicable to image signals which are encoded on a frame unit basis. This application brings about the same effects as the second embodiment as have been described above.

Still further, in the above first and second embodiments, the image signal processing has been described by way of the image editing by composition. However, the invention is applicable to other cases, for instance the case of transforming the brightness level in part. In other words, the invention is applicable to the case where the input encoded image signals are only of a single sort.

Still further, in the above-described, processing of image signals is carried out solely by the first embodiment or the second. It is apparent, however, that respective image signal processing methods as described in connection with each of the above two embodiments may be used in combination.

As described in detail above, the image signal processor of the invention may bring about the following effects. That is, in the image transform processing of the objective encoded image signals, decoding of the objective encoded image signals is performed by pointing out its local portion divided spatially or on a time series basis, while the portions other than that specified are left as they are without being decoded. Thus, the portion to be decoded is minimized while the image quality may be maintained at a high level despite the repetitive image transform processing. Furthermore, the time required for the image transform processing is shortened, whereby the efficiency of the image transform processing is enhanced.

What is claimed is:

1. An image signal processor comprising:

an encoded image signal pickup means which encodes an image on the basis of a unit as defined by dividing the image spatially and/or on a time series basis and picks up one or a plurality of encoded image signals;

an object specifying means which specifies the objective encoded image signals contained in a unit selected as an object of image transform processing from the encoded image signals picked up by said encoded image signal pickup means;

a local decoding means which locally decodes only the encoded image signals specified by said object specifying means;

a processing means which performs predetermined processing of the image signals decoded by said local decoding means;

a local encoding means which locally encodes the image signals processed by said processing means; and a composing means which composes the encoded image signals encoded by said local encoding means and the original encoded signals contained in units other than the objective unit.

2. A system as claimed in claim 1, wherein said unit is a block unit which is obtained by spatially dividing the image, and said object specifying means specifies encoded image signals contained in a block unit which is specified as an object of the image transform processing.

3. A system as claimed in claim 2, wherein encoding of the image signals contained in one block unit does not influence encoding of the image signals contained in the other block units.

4. A system as claimed in claim 1, wherein each unit is a field unit obtained by dividing the image on a time series basis, and said object specifying means specifies encoded image signals contained in the field unit which is specified as an object of the image transform processing.

5. A system as claimed in claim 4, wherein encoding of the image signals contained in the field unit specified by said object specifying means may influence to encoding of the image signals contained in the other field units, but encoding the other field units does not influence the former.

6. A system as claimed in claim 1, wherein said processing for encoding is irreversible.

* * * * *